INVENTOR.
LOUIS E. TRIMMER
HUNTER H. COVER, JR.

United States Patent Office 3,489,613
Patented Jan. 13, 1970

3,489,613
BATTERY COMPRISING AN ALKALI METAL SUPEROXIDE CATHODE
Louis E. Trimmer, Westminster, Colo., and Hunter H. Cover, Jr., Van Nuys, Calif., assignors to Sundstrand Corporation, a corporation of Delaware
Filed Apr. 29, 1964, Ser. No. 363,401
Int. Cl. H01m 35/02, 31/04, 27/04
U.S. Cl. 136—83                              11 Claims

ABSTRACT OF THE DISCLOSURE

A battery or fuel cell which includes a plastic container containing two anodes, each composed of solid propellant fuel, e.g., aluminum, and a cathode composed of solid propellant oxidizer, e.g., solid potassium superoxide. The anodes are mounted spaced from each other with the cathode spaced therebetween in an electrolyte, e.g., potassium hydroxide, with a Teflon-coated stainless steel screen as an ionically permeable interchange wall between the cathode and each anode. The container lid has lead line and gas vent ports lined with copper tubing, and a thermocouple is suspended from the lid into each anode chamber.

---

This invention relates to batteries or fuel cells in which fuel elements are chemically reacted for producing electric energy. More particularly, this invention relates to such batteries or fuel cells in which an oxidation-reduction reaction occurs in an electrolyte environment.

Development of lightweight equipment to be driven by electric energy for use where weight considerations are important has resulted in a need for electric energy sources in the form of batteries or fuel cells with high energy per weight and high energy per volume ratios. For example, it has become desirable to develop batteries with theoretical output exceeding 300 to 500 watt hours per pound.

It is a general object of this invention to provide a new and useful battery or fuel cell.

A further object of this invention is to provide a new and useful fuel cell producing electrical energy through chemical reaction of certain anodic and cathodic materials separated by an electrolyte.

Still another object of this invention is to provide a new and useful fuel cell having high energy:weight and energy:volume ratios.

Yet another object of this invention is to provide a fuel cell wherein a solid propellant oxidizer is used for oxidation of a solid propellant fuel to produce electrical energy.

Figure 1:
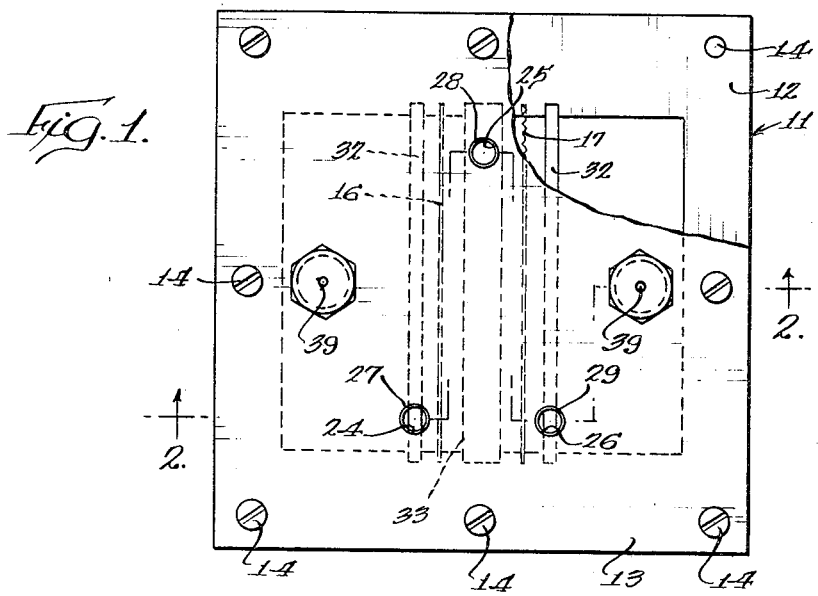
Figure 2:
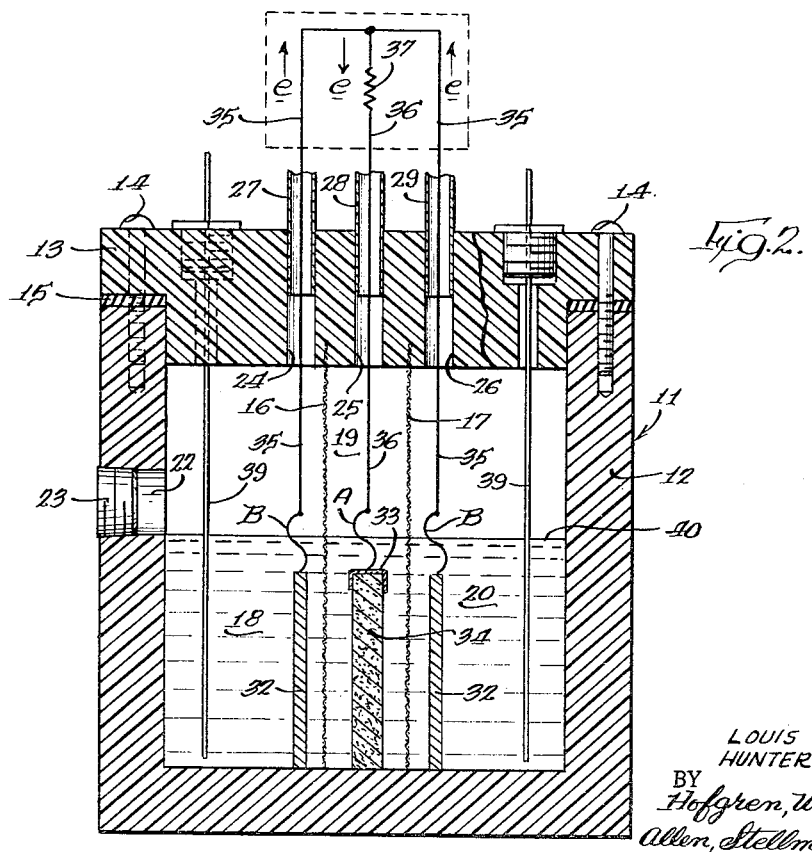

Other objects of this invention will be apparent from the following description and from the drawings in which:

FIGURE 1 is a top view of a battery or fuel cell in accordance herewith, partially cut away to shown internal construction; and FIGURE 2 is a section through the fuel cell illustrated in FIGURE 1 along line 2—2 of FIGURE 1.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

Turning now to the drawings, as an example of one embodiment of the invention and with reference to FIGURES 1 and 2, there is provided a fuel cell in which a solid propellant oxidizer cathode is used to oxidize a solid propellant fuel anode in the presence of an electrolyte for producing electric energy. In the form of fuel cell shown, an electrically nonconductive shell 11 comprises a cup-like plexiglass container 12 and a plexiglass cover 13 secured thereto by screws 14. A sealing gasket 15 of a plastic material, such as Kel–F, is interposed between cover 13 and container 12 at the juncture thereof.

Shell 11 defines an interior reaction chamber across which is disposed a pair of electrolyte-permeable interchange walls 16 and 17, each constructed of stainless steel screen of about 100 mesh coated with a thin coat of plastic, e.g. Teflon. It will be noted that the interchange walls 16 and 17 divide the reaction zone within shell 11 into three electrode compartments 18, 19 and 20. Compartments 18 and 20 are anode compartments and compartment 19 is a cathode compartment. A port 22 and a removable plastic plug 23 are provided in shell 11 for introduction of electrolyte into the reaction chamber. Ports 24, 25 and 26 are provided in cover 13 for venting gases from electrode compartments 18, 19 and 20, respectively. Each of ports 24, 25 and 26 is lined with a copper tube 27, 28 and 29, respectively. Copper tubes 27, 28 and 29 project upwardly beyond the outlet ends of ports 24, 25 and 26.

In each anode compartment 18 and 20 there is provided an anode 32 in the form of an aluminum plate which is mounted in the anode compartment, e.g. fitted in slots in the plexiglass walls of container 12 at each end of anode 32. Anodes 32 are spaced from interchange walls 16 and 17.

In the cathode compartment 19 there is mounted a cathode assembly including a solid cathode 34 of propellant oxidizer, e.g. potassium superoxide, sodium superoxide or the like, with an electrically conductive cap 33. The cathode assembly of cathode 34 and cap 33 is spaced from the interchange walls 16 and 17. The cap 33 is for the purpose of providing a surface to which a flexible lead A can be easily attached for electrically conductive contact with the surface of the cathode 34.

Leads 35 and 36 are provided from anode 32 and cathode 34 respectively. The lead 36 from cathode 34 is in electrical contact with cap 33 through flexible lead A. Leads 35 are in electrical contact with anodes 32 through flexible leads B. Leads 35 and 36 may be used to connect anodes 32 and cathode 34, respectively, to opposite sides of a load, such as indicated at reference numeral 37, thereby applying the battery or fuel cell across load 37.

In each of the anode compartments 18 and 19 there is provided a copper-constantan thermocouple 39 for detecting temperatures within the reaction chamber.

In the fuel cell of the present invention, the anode, although illustrated in the figures as a sheet of aluminum may be of any shape or form and may be formed of any solid fuel material, advantageously an inorganic solid propellant fuel, and preferably a metal or metal hydride which is readily oxidizable by a propellant oxidizer cathode through an electrolytic solution. Specific examples of suitable anode materials include, but are not limited to, aluminum, lithium hydride, zinc, calcium and the like. It is also intended that organic fuel elements may be used.

The cathode 34 in the illustrated form is a mass of potassium superoxide. Alternatively, the cathode may be any solid oxidizer, and preferably an inorganic solid propellant oxidizer, although it is intended that organic and other inorganic oxidizers may be used. The cathode material should be in solid state at the operating temperature of the fuel cell. During the electrochemical reaction, the cathode material undergoes reduction as the fuel cell furnishes electric power while the anode undergoes oxidation. Thus, the cathode functions as an oxidizing material for oxidizing the anode through the electrolyte. Specific examples of oxidizer materials for use as cathodes include the inorganic superoxides, perchlorides, peroxides, etc.; organic oxidizers in solid form may also be used.

The electrolyte is included in the fuel cell in contact with the anode and cathode. For example, in the fuel cell of the drawings, with reference to FIGURE 2, the level of electrolyte is shown by reference numeral 40, the electrolyte extending through the interchange walls 16 and 17 and in contact with the anodes 32 and cathode 34. Apparently any of the usual electrolytes may be used, e.g. aqueous solutions containing a soluble salt such as a chloride, or bromide of an alkali metal, alkaline earth metal, ammonium or the like. The concentration of electrolyte is not critical and, as will be seen, where the electrolyte is an alkali metal hydroxide in the preferred system using an alkali metal superoxide cathode, the electrolyte concentration may be increased during the life of the fuel cell, assuming no addition of water or exchange of electrolyte in the reaction chamber. Other useful electrolytes will be apparent to those in the art although aqueous solutions of the alkaline metal hydroxides, such as sodium hydroxide and potassium hydroxide are preferred. The material of shell 11 should not be corrodible by the electrolyte.

The cathode and anode materials are capable of oxidation-reduction reaction in the presence of the electrolyte, whereby the anode is oxidized and the cathode is reduced. The reaction takes place within the reaction chamber, through the electrolyte, usually at normal temperatures and pressures. Assuming an aqueous electrolyte, at the cathode the solid propellant oxidizer reacts with water to form oxygen and a derivative of the oxidizer, while at the anode the propellant fuel consumes oxygen. In the reduction reaction at the cathode, electrons are utilized in the production of free oxygen; at the anode, electrons are produced as the anode material is transformed to an oxidized form. More specifically, assuming a cathode of potassium superoxide and an anode of aluminum, the cathode reaction can be assumed to be:

$$2KO_2 + H_2O \rightarrow 2KOH + 3/2 O_2$$

and at the anode:

$$2Al + 3/2 O_2 \rightarrow Al_2O_3$$

giving an over-all cell reaction of:

$$2KO_2 + H_2O + 2Al \rightarrow 2KOH + Al_2O_3$$

for such a cell the electrolyte may be the alkaline metal hydroxide corresponding to the metal of the alkaline metal superoxide oxidizer, i.e. potassium hydroxide, which, it will be noted from the over-all reaction, is produced by the reaction with consumption of water, thereby increasing electrolyte concentration as the reaction continues. Although the theoretical reaction shows the consumption of water hydrogen may also be formed from the interaction of potassium hydroxide in forming potassium aluminate in lieu of the potassium hydroxide and aluminum oxide of the above theoretical equation. When the potassium superoxide reacts with water oxygen is formed which may recombine with the hydrogen, producing sufficient water to make up for that used in the reaction with the superoxide. Similarly, potassium hydroxide is consumed in forming the potassium aluminate so undue increase in potassium hydroxide concentration in the electrolyte at the expense of water is not believed to be a problem.

Returning again to the anode reaction, it will be seen that the oxidation of the aluminum produces electrons:

$$2Al \rightarrow 2Al^{+++} + 6e^-$$

and the cathode reaction consumes electrons:

$$2KO_2 + H_2O + 6e^- \rightarrow 2KOH + 5(O^{--})$$

The over-all reaction is generally in conformity with that set out above for the fuel cell.

In experimentation with the fuel cell system of the present invention, it has been discovered that gases, especially in the form of oxygen, are evolved from the fuel cell compartments, and for this reason provision is made for venting such gases from the compartments.

In working with the concept of the present invention, a fuel cell structure was assembled by pressing a cathode element from potassium superoxide in cylindrical pellet form roughly one inch in diameter. A perforated ¼ inch diameter stainless steel tube was projected through the pellet to collect oxygen. The pellet and tube were inserted into a piece of one-inch aluminum tubing to form a configuration having generally co-linear axes of the stainless steel tube, pellet and aluminum tube. This assembly was then placed in a beaker with the axis generally vertical and water was added to the beaker to cover the potassium superoxide pellet. Electrically conductive lead wires were connected to the aluminum tubing and the stainless steel tube and the leads were applied across a load to test the electrical energy output. The level of voltage output from the fuel cell was maintained for a period of time whereupon a sharp decrease in voltage accompanied depletion of the superoxide as an oxidizing agent.

It will be apparent that through the use of the solid fuel elements and oxidizers as set out herein, batteries or fuel cells may be constructed with high energy:weight and energy:volume ratios, since the oxidizers and fuels themselves are compact and of light weight relative to the amount of energy which can be produced from them. Also, simple fuel cell designs are possible using such oxidizers and fuels because attentive equipment can be maintained at a minimum.

We claim:

1. A battery comprising a cell including ion permeable wall means defining at least two chambers, a consumable anode mounted in one chamber, a cathode comprising alkali metal superoxide mounted in the other chamber spaced from said anode, an alkaline electrolyte in said reaction chambers ionically interconnecting said anode and said cathode and electrically conductive means contacting said anode and cathode respectively for delivery of a current from the battery when applied across a load.

2. The battery of claim 1 wherein said anode is aluminum.

3. The battery of claim 1 wherein said electrolyte is an aqueous solution of alkali metal hydroxide.

4. A battery comprising a shell defining a reaction chamber, an aluminum anode mounted in said chamber, a mass of solid alkali metal superoxide cathode mounted in said chamber spaced from said anode, an aqueous liquid alkali metal hydroxide electrolyte in said chamber ionically interconnecting said cathode and anode, and electrically conductive means for applying said anode and cathode across a load.

5. The battery of claim 4 wherein said alkali metal superoxide is selected from the class consisting of potassium superoxide and sodium superoxide.

6. A battery comprising a shell defining a reaction chamber, a consumable anode mounted in said chamber, a solid cathode mounted in said chamber spaced from said anode and comprising a solid mass containing alkali metal superoxide, an aqueous liquid alkaline electrolyte in said chamber in contact with both said anode and cathode, an ionically permeable interchange wall across said reaction chamber between said anode and said cathode for defining an anode chamber and a cathode chamber within said reaction chamber, port means through said shell for venting gases from said reaction chamber and electrically conductive means for connecting said anode and cathode in electric circuit across a load.

7. The battery of claim 6 wherein said interchange wall is Teflon-coated stainless steel screen spaced from and between said anode and cathode, and extending across said reaction chamber, 8. A battery comprising a plexiglass shell defining a reaction chamber, a pair of electrolyte-permeable and ionically permeable interchange walls spaced from each other and spanning said chamber for dividing said chamber into three compartments, said three compartments including two end anode compartments and one central cathode compartment, an aluminum anode mounted in each of said anode compartments and spaced from said interchange wall, an alkali metal superoxide cathode mounted in said cathode chamber and spaced from each of said interchange walls, an inlet for introducing electrolyte into said reaction chamber for filling said anode and cathode compartments with electrolyte in contact with said anodes and said cathode, separate port means through said shell for venting gases from each of said compartments, copper tube means lining each of said venting ports, a thermocouple in each of said anode chambers for detecting anode chamber temperature, and electrically conductive means for interconnecting each of said anodes and for connecting the interconnected anodes and said cathode in electric circuitry across a load.

9. An electro-chemical method for providing electric power, which method comprises ionically interconnecting spaced electrode masses separated by ion permeable wall means, said masses comprising a consumable anode and an alkali metal superoxide cathode with an alkaline electrolyte in a reaction zone and electrically connecting said separate masses across a load.

10. The method of claim 9 wherein said anode is aluminum.

11. The method of claim 10 wherein said alkali metal superoxide is potassium superoxide.

References Cited

UNITED STATES PATENTS 2,554,447   5/1951   Sargent _____ 136—100

FOREIGN PATENTS 5,922   4/1884   Great Britain.

WINSTON A. DOUGLAS, Primary Examiner

H. FEELEY, Assistant Examiner

U.S. Cl. X.R.

136—100, 137